UNITED STATES PATENT OFFICE.

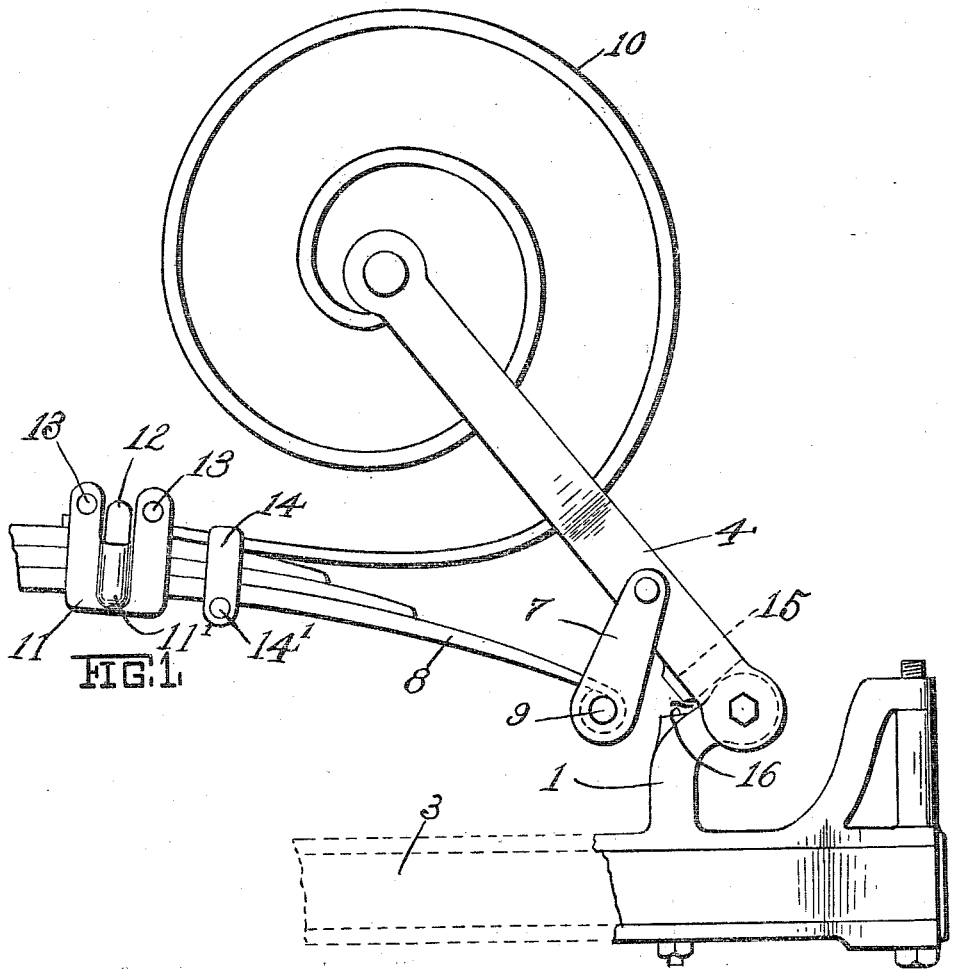

GEORGE H. STONER, OF EAST BOSTON, AND EDWARD L. GILSON, OF ROSLINDALE, MASSACHUSETTS.

SHOCK-ABSORBER.

1,279,034.   Specification of Letters Patent.   Patented Sept. 17, 1918.

Application filed September 14, 1917.   Serial No. 191,351.

*To all whom it may concern:*

Be it known that we, GEORGE H. STONER and EDWARD L. GILSON, citizens of the United States, residing at East Boston, county of Suffolk, Commonwealth of Massachusetts, and Roslindale, county of Suffolk, Commonwealth of Massachusetts, respectively, have invented certain new and useful Improvements in Shock-Absorbers, of which the following is a specification.

This invention relates to shock absorbers and particularly to an absorber of the auxiliary type adapted to directly coöperate with the main suspension springs of a vehicle.

Our absorber is capable of application to various types of spring suspension, but is particularly adapted to the transverse spring system of the Ford car.

For purposes of illustration, we have shown as an illustrative embodiment a form of our invention especially adapted to the Ford automobile although as stated above it is understood to be capable of other application and other embodiment.

In absorbing a car shock through an intermediate spring, several difficulties are present, some of which are peculiar to the presence of the intermediate spring, while others common to shock absorption in general. Thus it is found that while the rebound is present as in any other form, its direction is of variant phase and requires a different treatment from that where shock is to be directly absorbed. The type of absorber herein shown as an illustrative embodiment, employs a general lever mounting heretofore illustrated in several prior patents in the art and is represented on the market.

In our present application we utilize the lever principle of the earlier types, but combine them in a new relation to both the lever and the main spring.

Throughout the specification and drawings like references and numerals are employed to indicate corresponding parts and in the drawings:

Figure 1 is a side elevation of our device with only such parts of the main spring and axle indicated as necessary, and Fig. 2 is a plan view of the parts shown in Fig. 1 but with the indication of the axle omitted.

In the form shown, our device consists of an axle bracket 1 which is clamped by a bolt 2 to an axle indicated in broken lines 3. Pivoted on the upper end of the bracket 1 is a forked lever arm 4 consisting of a pair of plates $4^1$ bolted through the bracket 1 and pivoted bolt 6 and connected by a bolt 6 to a pair of links 7 which straddle the main spring 8 and pivotally held thereto by the bolt 9. The upper end of the lever 4 embraces a flat spiral spring 10 set in the plane of the lever and of the main spring 8 to which it is clamped by a main clip 11 which straddles preferably one of the spring clips 12 against which the free end of the spring 10 abuts. The clip 11 has on each side a swelled portion $11^1$ adapted to receive the edges of the clip 12 and is held in place by the bolt 13. We usually provide an auxiliary clip 14 held by a bolt 15 as an additional clamp for the spring 10. It will be noted that the bifurcated lever 4 which embraces the spring 10 guides and steadies it and preserves the whole in alinement and in the plane of the movement of the lever 4 which is also the plane of movement of the spring 8. The lever 4 is provided with a stop 15 adapted to coact with a shoulder 16 on the bracket 1 in case of extreme motion of the lever.

It will be noted that the spring 8 not only has a vertical play under shock and rebound, but has also an end thrust due to its lengthening effect under compression and an end pull due to its shortening effect under rebound. It is to be further noted that the spring 10 is so disposed as to afford a maximum resistance under shock, but to have a minimum rebound effect, and that only for a very short phase of action, which is almost immediately met by a resisting spring action in the other direction due to the winding effect of the lever 4 as it returns.

Thus we are able to secure a simple disposition of these parts, a maximum absorption not only of the direct compression and rebound of the main spring itself in its vertical movement, but also a steadying control of the longitudinal movement of the spring under both compression and rebound.

Various modifications in the form and construction of our device may obviously be resorted to if within the limits of the appended claims.

What we therefore claim and desire to secure by Letters Patent is:

1. In combination with a main spring of a vehicle, a lever pivoted thereto between the lever ends, a support carried by the axle adjacent thereto and fulcrumed to the lever end, and a flat spiral spring mounted by its exterior outer end on said main spring in the plane of movement of said lever and attached at its inner end to the free end of said lever.

2. In combination with a main spring of a vehicle, a lever pivoted thereto between the lever ends, a support carried by the axle adjacent thereto and fulcrumed to the lever end, and a flat spiral spring mounted by its exterior and oppositely faced outer end on said main spring and attached at its inner end to the free end of said lever.

3. In combination with a main spring of a vehicle, a bifurcated lever pivoted thereto between the lever ends, a support carried by the axle adjacent thereto and fulcrumed to the lever end, and a flat spiral spring mounted by its exterior and oppositely faced outer end on said main spring and disposed between said bifurcations attached at its inner end to the free ends thereof.

In testimony whereof we affix signatures in presence of two witnesses.

GEORGE H. STONER.
EDWARD L. GILSON.

Witnesses:
MARY V. WOTHERSPOON,
VICTORIA LOWDEN.

Copies of this patent may be obtained for five cents each, by addressing the "Commissioner of Patents, Washington, D. C."